US012304548B2

United States Patent
Wu et al.

(10) Patent No.: US 12,304,548 B2
(45) Date of Patent: May 20, 2025

(54) BABY STROLLER AND LATERAL SEAT COVER PORTION THEREOF

(71) Applicant: Wonderland Switzerland AG, Steinhausen (CH)

(72) Inventors: Bo Wu, Dongguan (CN); Wenhao Li, Dongguan (CN)

(73) Assignee: WONDERLAND SWITZERLAND AG, Steinhausen (CH)

(*) Notice: Subject to any disclaimer, the term of this patent is extended or adjusted under 35 U.S.C. 154(b) by 42 days.

(21) Appl. No.: 18/337,639

(22) Filed: Jun. 20, 2023

(65) Prior Publication Data
US 2023/0415807 A1   Dec. 28, 2023

(30) Foreign Application Priority Data

Jun. 22, 2022   (CN) .......................... 202221578873.7
Nov. 28, 2022   (CN) .......................... 202211505490.1

(51) Int. Cl.
*B62B 9/14*   (2006.01)
*B62B 7/00*   (2006.01)
*B62B 7/06*   (2006.01)

(52) U.S. Cl.
CPC .............. *B62B 9/142* (2013.01); *B62B 7/004* (2013.01); *B62B 7/062* (2013.01)

(58) Field of Classification Search
CPC ............ B62B 9/12; B62B 9/102; B62B 9/108
See application file for complete search history.

(56) References Cited

U.S. PATENT DOCUMENTS

| 2,797,743 | A | * | 7/1957 | Rodtz, Jr. | ............... | B62B 9/108 |
| | | | | | | 297/229 |
| 4,478,453 | A | * | 10/1984 | Schutz | ................. | B60N 2/2881 |
| | | | | | | 297/219.12 |
| 4,824,168 | A | * | 4/1989 | Makoski | ................... | B62B 9/00 |
| | | | | | | 297/229 |

(Continued)

FOREIGN PATENT DOCUMENTS

| CN | 106004968 | A | 10/2016 | | |
| DE | 102023116116 | A1 | * | 12/2023 | ............. B62B 7/004 |

(Continued)

OTHER PUBLICATIONS

"First Office Action Issued in Corresponding Taiwanese Patent Application No. 112123455", Mailed Date: May 9, 2024, 19 pages.

(Continued)

*Primary Examiner* — Jeffrey J Restifo
(74) *Attorney, Agent, or Firm* — Volpe Koenig (57) ABSTRACT

A baby stroller and a lateral seat cover portion thereof are provided. The lateral seat cover portion of a baby stroller includes a fabric bag including an inner side fabric and an outer side fabric opposite to each other, a foldable plate wrapped in the fabric bag and located between the inner side fabric and the outer side fabric, and an auxiliary device. The foldable plate includes a first plate and a second plate pivotally connected, when a frame of the baby stroller in an unfolded state, the foldable plate is in an unfolded state. When the frame of the baby stroller is folded, the auxiliary device enables an outer side of the first plate and an outer side of the second plate to approach each other, thereby switching the foldable plate from the unfolded state to a folded state.

10 Claims, 8 Drawing Sheets

(56) References Cited

U.S. PATENT DOCUMENTS

| | | | | |
|---|---|---|---|---|
| 5,441,328 | A * | 8/1995 | Snyder | B62B 9/108 |
| | | | | 297/452.34 |
| 5,615,927 | A * | 4/1997 | Kassai | A47D 1/00 |
| | | | | 297/452.36 |
| 5,662,380 | A * | 9/1997 | Tam | B62B 9/102 |
| | | | | 297/440.11 |
| 5,954,404 | A * | 9/1999 | Suzuki | B62B 9/10 |
| | | | | 297/219.12 |
| 7,410,213 | B1 * | 8/2008 | Ferrari-Cicero | B60N 2/60 |
| | | | | 297/219.12 |
| 7,431,395 | B2 * | 10/2008 | Morgan | B62B 9/108 |
| | | | | 297/219.12 |
| 7,445,230 | B2 * | 11/2008 | Kassai | B62B 7/123 |
| | | | | 280/644 |
| 7,537,284 | B1 * | 5/2009 | Antorcha | B60N 2/2881 |
| | | | | 297/219.12 |
| 7,568,762 | B2 * | 8/2009 | Paulson | B60N 2/28 |
| | | | | 297/219.12 |
| 7,677,661 | B1 * | 3/2010 | Ferrari-Cicero | B60N 2/2881 |
| | | | | 297/219.12 |
| 9,278,631 | B2 * | 3/2016 | Ferraro | B60N 2/2812 |
| 9,956,980 | B2 * | 5/2018 | Nygren | B62B 9/24 |
| 2008/0136231 | A1 * | 6/2008 | Doherty | B60N 2/2881 |
| | | | | 297/219.12 |
| 2015/0075539 | A1 * | 3/2015 | Serdyuk | B60N 2/28 |
| | | | | 128/845 |
| 2017/0101039 | A1 * | 4/2017 | Fadael-Correa | B60N 2/6027 |
| 2022/0410960 | A1 * | 12/2022 | Zehfuss | B62B 9/24 |
| 2023/0039662 | A1 * | 2/2023 | Hu | B62B 7/083 |
| 2023/0067180 | A1 * | 3/2023 | Wu | B62B 9/102 |
| 2023/0137642 | A1 * | 5/2023 | Miyasaka | B62B 9/102 |
| | | | | 454/165 |
| 2023/0415807 | A1 * | 12/2023 | Wu | B62B 7/062 |

FOREIGN PATENT DOCUMENTS

| | | |
|---|---|---|
| JP | 2015013566 A | 1/2015 |
| JP | 2016193653 A | 11/2016 |
| TW | M624282 U | 3/2022 |

OTHER PUBLICATIONS

Office Action issued in corresponding Japanese Application No. 2023-102285 dated Jan. 9, 2020. Google Machine Translation Included.

* cited by examiner

BABY STROLLER AND LATERAL SEAT COVER PORTION THEREOF

CROSS-REFERENCE TO RELATED APPLICATIONS

This application claims priority of Chinese Patent Application No. 202221578873.7, filed on Jun. 22, 2022, and Chinese Patent Application No. 202211505490.1, filed on Nov. 28, 2022, the contents of which are hereby incorporated by reference in their entireties.

TECHNICAL FIELD

The present disclosure relates to a baby stroller and a lateral seat cover portion thereof.

BACKGROUND

Baby stroller usually includes a frame and a seat cover provided on the frame. The frame of most baby strollers can be provided with an unfolded state and a folded state. In the unfolded state, the seat cover is unfolded to form a space for a child to ride, and in the folded state, the seat cover is folded together with the frame to facilitate storage of the baby stroller.

The seat cover of the baby stroller generally includes a seat portion, a backrest portion and two lateral seat cover portions. However, when the frame is folded, since the material of the seat cover is generally made of soft material and is difficult to control a folding direction thereof, the lateral seat cover portion may be folded in such a way that both middle portions thereof protrude outwardly to the left and right sides of the baby stroller, respectively. On the one hand, the two protruded lateral seat cover portions affect a folding direction of the frame to be folded and bring inconvenience to a user's operation. On the other hand, redundant wrinkles may be generated on the two lateral seat cover portions and the appearance of the baby stroller is affected.

SUMMARY

According to some embodiments of the present disclosure, a baby stroller and a lateral seat cover portion thereof are provided.

A lateral seat cover portion of a baby stroller includes a fabric bag including an inner side fabric and an outer side fabric opposite to each other, a foldable plate wrapped in the fabric bag and located between the inner side fabric and the outer side fabric, and an auxiliary device. The foldable plate includes a first plate and a second plate pivotally connected to the first plate, when a frame of the baby stroller in an unfolded state, the foldable plate is in an unfolded state. When the frame of the baby stroller is folded, the auxiliary device enables an outer side of the first plate and an outer side of the second plate to approach each other, thereby switching the foldable plate from the unfolded state to a folded state.

A baby stroller includes a frame and a seat cover provided on the frame. The seat cover includes a seat portion, a backrest portion connected to the seat portion, two side wing portions provided on two sides of the backrest portion, and the aforementioned lateral seat cover portion connected to the two side wing portions, respectively.

Details of one or more embodiments of the present disclosure are set forth in the following drawings and descriptions. Other objects, purposes and advantages will become apparent upon review of the following specification, drawings and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DETAILED DESCRIPTION OF THE EMBODIMENTS

In order to facilitate the understanding of the present disclosure, the present disclosure is described more comprehensively below with reference to the relevant accompanying drawings. Preferred embodiments of the present disclosure are shown in the accompanying drawings. However, the present disclosure may be implemented in many different forms and is not limited to the embodiments described herein. On the contrary, the purpose of providing these embodiments is to make the public content of the present disclosure more thoroughly and comprehensively understood.

It should be noted that when an element is called "fixed to" another element, it can be directly fixed to another element or there may be intermediate elements. When an element is considered to be "connected to" another element, it can be directly connected to another element or intervening elements may also be present. The terms "vertical", "horizontal", "left", "right", and similar expressions are used herein for purposes of illustration only.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure. The term "and/or" as used herein includes any and all combinations of one or more related listed items.

Figure 1:
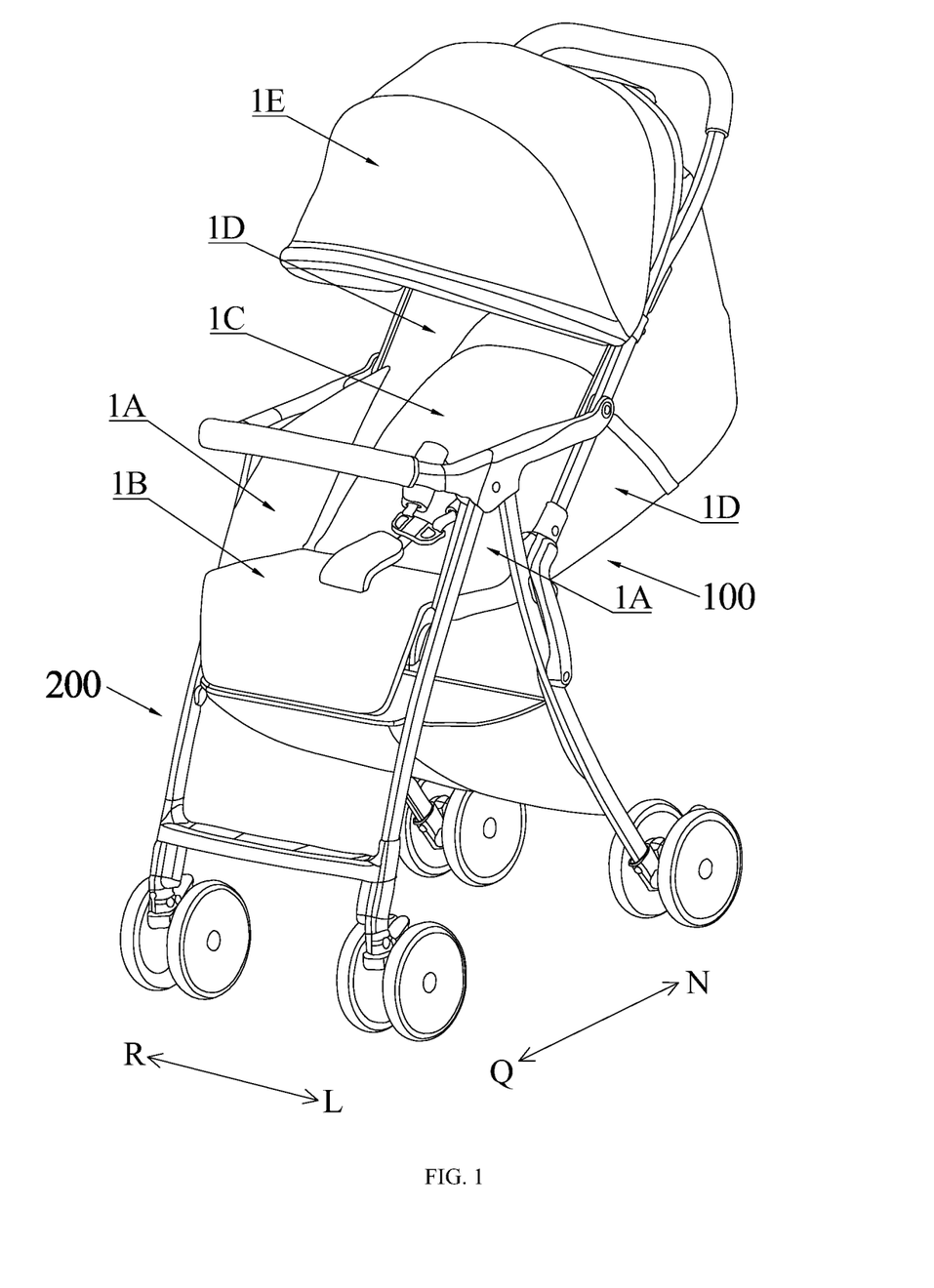
FIG. 1 is a perspective view of a baby stroller according to an embodiment of the present disclosure.

Referring to FIG. 1, a baby stroller is provided according to an embodiment of the present disclosure, which includes a frame 200 and a seat cover 100 provided on the frame 200. The seat cover 100 includes a lateral seat cover portion 1A.

Figure 2:
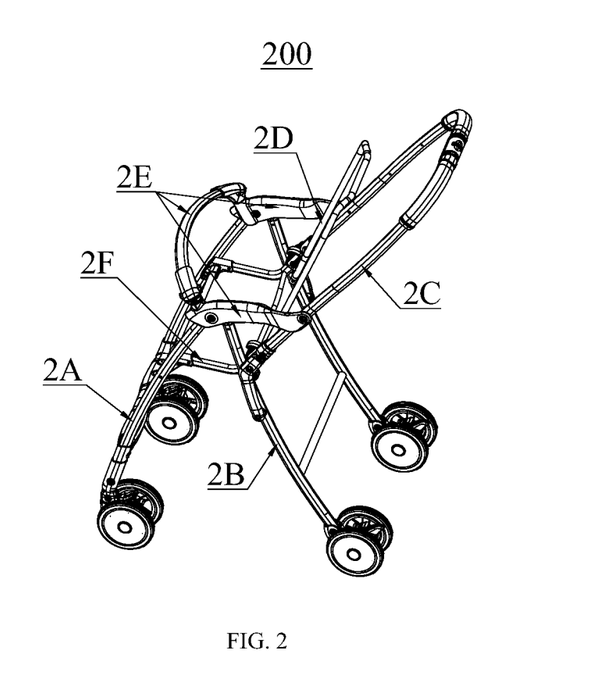
FIG. 2 is a perspective view of a frame of the baby stroller of FIG. 1, showing the frame in an unfolded state.
Figure 3:
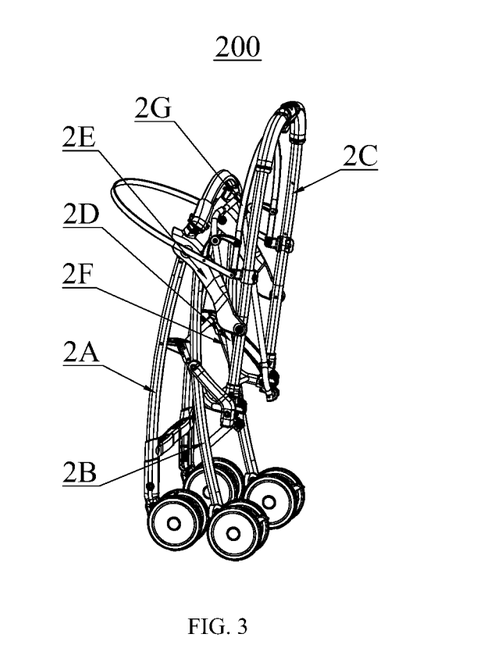
FIG. 3 is a perspective view of a frame of the baby stroller of FIG. 1, showing the frame in a folded state.

Referring to FIG. 2 and FIG. 3, in an embodiment, the frame 200 may include a front wheel frame 2A, a rear wheel frame 2B, a pushing handle 2C, a backrest frame 2D, an armrest frame 2E, a seat frame 2F, and a sunshade frame 2G. The connection relationship of these components may be referred to the related technology, and is not described herein. The positional relationship between these components can be changed according to usage requirements, so that the frame 200 has an unfolded state shown in FIG. 2 and a folded state shown in FIG. 3. In some alternative embodiments, the frame 200 may have other structures.

Referring to FIG. 1, in some embodiments, the seat cover 100 may include a seat portion 1B, a backrest portion 1C, two side wing portions 1D, two lateral seat cover portions 1A, and an sunshade 1E. The seat portion 1B is mainly supported on the seat frame 2F, the backrest portion 1C is mainly supported on the backrest frame 2D, and the sunshade 1E is mainly supported on the sunshade frame 2G. The backrest portion 1C is connected to a rear end of the seat portion 1B. Two side wing portions 1D are provided on the left and right sides of the backrest portion 1C. The lower edges of the two side wing portions 1D are connected to the left and right edges of the backrest portion 1C, respectively. The top portions of the two side wing portions 1D and the top portion of the backrest portion 1C are capable of being connected to the sunshade 1E. The two lateral seat cover portions 1A are substantially fan-shaped and are located on the left and right sides of the seat portion 1B. An edge of each lateral seat cover portion 1A is connected to the left or right edge of the seat portion 1B, and another edge of each lateral seat cover portion 1A is connected to the corresponding left or right side wing portion 1D. On the one hand, the two side wing portions 1D and the two lateral seat cover portions 1A limit the left and right movement range of a child. On the other hand, the collision between the child's body and the frame can be buffered. In some alternative embodiments, the seat cover 100 may have other structures.

It should be noted that, unless otherwise clearly specified and limited, the orientation terms such as "front", "rear", "left" and "right" in the embodiments of the present disclosure are based on the orientation of the baby stroller in a normal use state (unfolded state), the "left" and "right" directions are shown schematically with arrows L and R in the figures, and the "front" and "rear" directions are shown schematically with arrows Q and N in the figures. These orientation terms are only used to make the description of the embodiments of the present disclosure clearer, and are not used to improperly limit the protection scope of the present disclosure.

Figure 4:
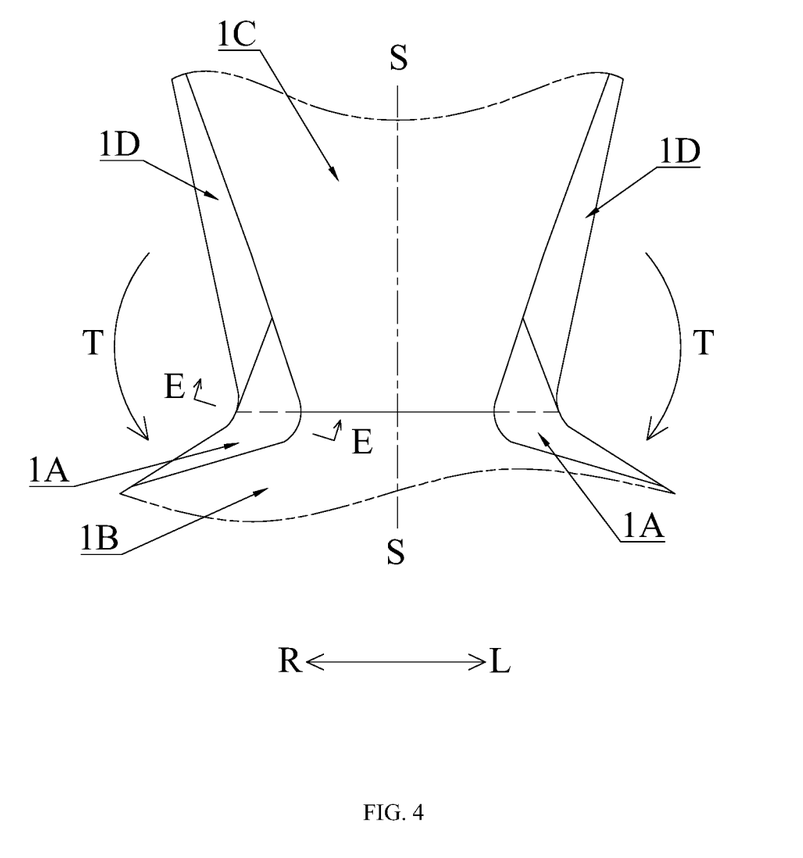
FIG. 4 is a schematic view of a seat cover provided on a frame in an unfolded state according to an embodiment of the present disclosure.

Referring to FIG. 3 and FIG. 4, when the frame 200 is folded, the backrest frame 2D approaches the seat frame 2F, and the backrest portion 1C rotates in a direction shown by an arrow T relative to the seat portion 1B, so that the backrest portion 1C and the seat portion 1B are folded close to each other, and each lateral seat cover portion 1A is folded correspondingly, thus driving each side wing portion 1D to be folded.

Referring to FIG. 4 to FIG. 8, the lateral seat cover portion 1A can be actively folded in a correct folding manner when the frame is folded (as shown in FIG. 4, a middle portion of each lateral seat cover portion 1A protrudes toward a longitudinal central axis S-S of the seat cover 100). The lateral seat cover portion 1A on the right side of the baby stroller is taken as an example for detailed description. It should be understood that the left lateral seat cover portion 1A is substantially symmetrical with the right lateral seat cover portion 1A with respect to the longitudinal central axis S-S of the seat cover 100.

Figure 5:
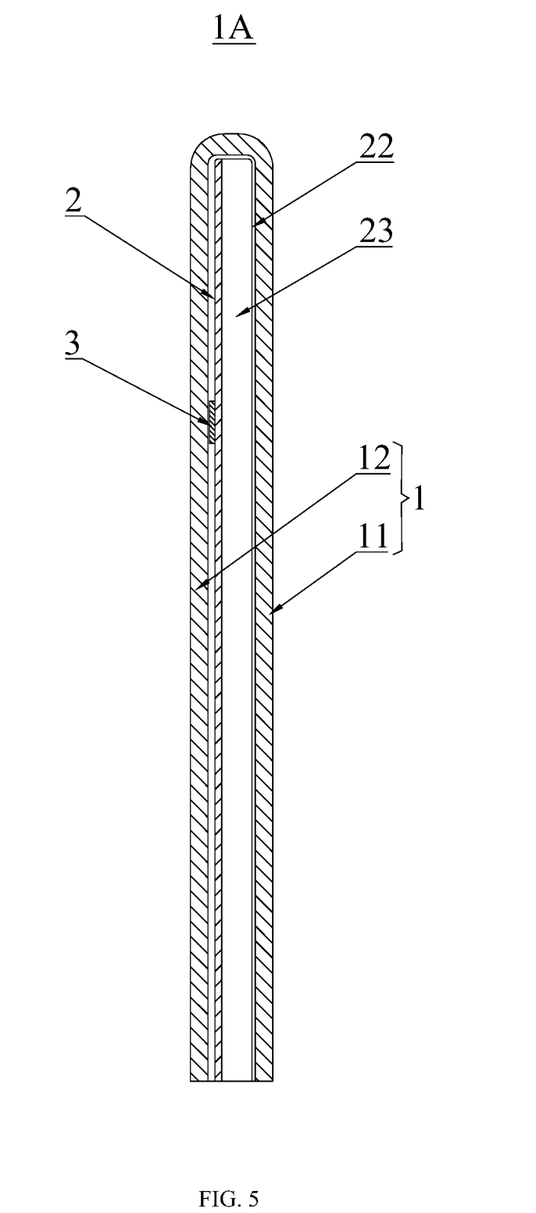
FIG. 5 shows a cross-sectional view taken along line E-E of FIG. 4.
Figure 6:
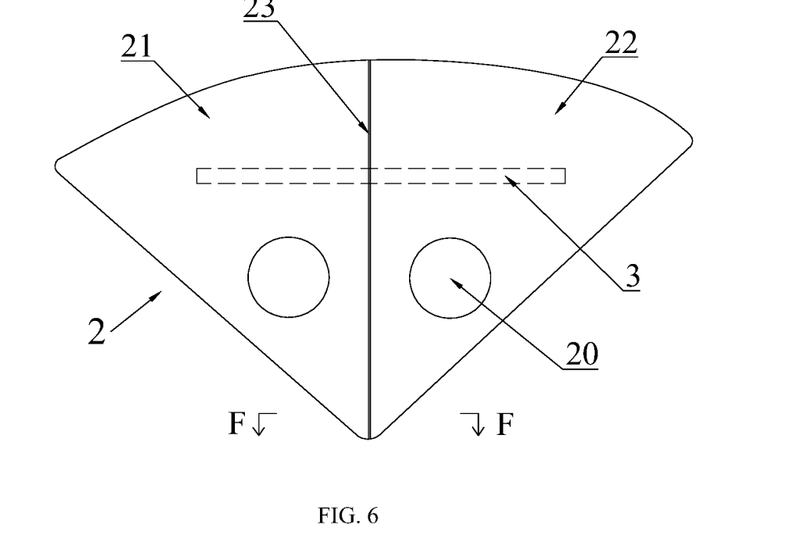
FIG. 6 is a front view of a foldable plate in an unfolded state according to an embodiment of the present disclosure.

Referring to FIG. 5 and FIG. 6, in some embodiments, the lateral seat cover portion 1A includes a fabric bag 1, a foldable plate 2, and an auxiliary device 3. The fabric bag 1 includes an inner side fabric 11 and an outer side fabric 12 opposite to each other, and the inner side fabric 11 is located closer to the longitudinal central axis S-S (shown in FIG. 4) of the seat cover 100 than the outer side fabric 12. The foldable plate 2 is wrapped in the fabric bag 1 and is located between the inner side fabric 11 and the outer side fabric 12. The foldable plate 2 includes a first plate 21 and a second plate 22 that are pivotally connected. When the frame 200 of the baby stroller is in the unfolded state, the foldable plate 2 is in the unfolded state as shown in FIG. 6. In some embodiments, a shape of the foldable plate 2 in the unfolded state fits with a shape of the fabric bag 1 to support the fabric bag 1 to be in a fan shape.

Figure 8:
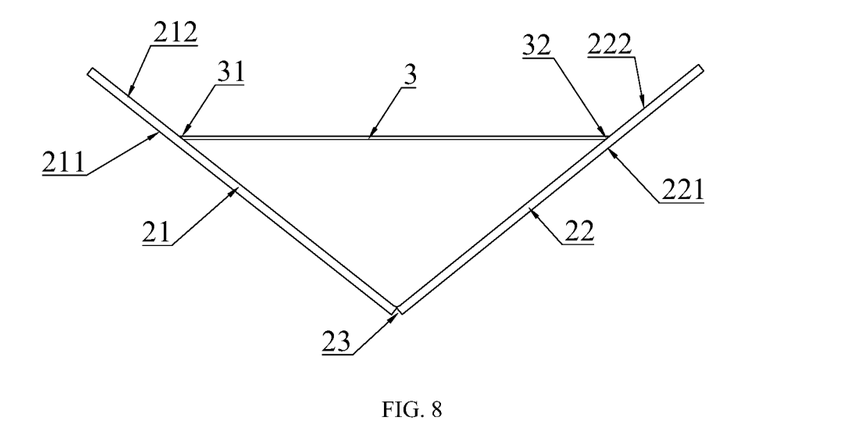
FIG. 8 is a top view of a foldable plate in a folded state according to an embodiment of the present disclosure.

Referring to FIG. 8, when the frame 200 of the baby stroller is folded, the first plate 21 and the second plate 22 can rotate relative to each other, so that the foldable plate 2 can be switched from the unfolded state to the folded state. The foldable plate 2 can drive the outer side fabric 12 and the inner side fabric 11 to fold together when being folded, so that the lateral seat cover portion 1A is switched from the unfolded state to the folded state. At the same time, the auxiliary device 3 enables an outer side 212 of the first plate 21 and an outer side 222 of the second plate 22 to approach each other, so that the foldable plate 2 is switched to the correct folded state, thereby enabling the lateral seat cover portion 1A to be folded in a correct manner, which effectively avoids the problem of poor frame folding and seat fabric wrinkling caused by the two folded lateral seat cover portions 1A protruding outwardly to the left and right sides, respectively.

Figure 7:
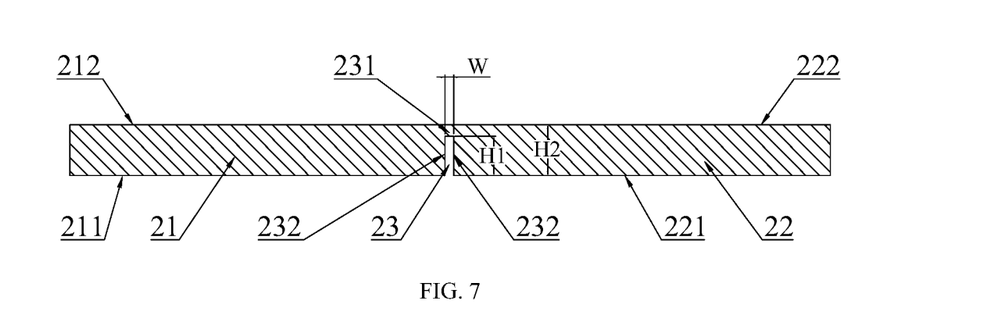
FIG. 7 shows a cross-sectional view taken along line F-F of FIG. 6.

FIG. 5 to FIG. 8 show an embodiment of the foldable plate 2 and the auxiliary device 3. The foldable plate 2 may be an integrally-formed element, such as a plastic plate with a certain hardness. The foldable plate 2 may be made of a suitable material, such as PE or PP. Referring to FIG. 7, a slot 23 is formed on an inner side of the foldable plate 2 (that is, a side of the foldable plate 2 facing the inner side fabric 11), for example, by cutting. An extending direction of the slot 23 is substantially perpendicular to an axis of rotation of the backrest portion 1C relative to the seat portion 1B. A depth H1 of the slot 23 is less than a thickness H2 of the foldable plate 2, that is, the slot 23 does not penetrate to the outer surface of the foldable plate 2.

In some embodiments, the inner side of the foldable plate 2 can be cut by a cutter along a cutting line on the inner side of the foldable plate 2, and the slot 23 is formed at the cutting line. In some other embodiments, the slot 23 with a certain width may be formed on the inner side of the foldable plate 2 by laser. In some other embodiments, the slot 23 may also be formed with the foldable plate 2 during a forming process of the foldable plate 2. Referring to FIG. 7, the slot 23 divides the foldable plate 2 into the first plate 21 and the second plate 22, that is, an inner side 211 of the first plate 21 and an inner side 221 of the second plate 22 are spaced apart by the slot 23.

Referring to FIG. 7 and FIG. 8, in some embodiments, the first plate 21 and the second plate 22 are pivotally connected via a bottom wall 231 of the slot 23. By reasonably configuring a size of the slot 23, the foldable plate 2 can be prevented from being folded in an incorrect manner, so that the foldable plate 2 is folded in a correct manner. For example, a width W of the slot 23 may be much less than the depth H1 of the slot 23. In this way, when the foldable plate 2 is folded, both sidewalls 232 of the slot 23 can abut against each other to prevent the inner side 211 of the first plate 21 and the inner side 221 of the second plate 22 from approaching each other, which will cause the foldable plate 2 to be folded in the correct folding manner with the outer side 212 of the first plate 21 and the outer side 222 of the second plate 22 approaching each other. In some embodiments, the width W of the slot 23 may be less than or equal to 2 mm.

Referring to FIG. 8, in some embodiments, the auxiliary device 3 may be an elastic member. A first end 31 of the elastic member is connected to the outer side 212 of the first plate 21, and a second end 32 of the elastic member is connected to the outer side 222 of the second plate 22. Referring to FIG. 6, when the foldable plate 2 is in the unfolded state, the elastic member is in a stretched state. When the frame 200 is folded, the elastic member resets and pulls the foldable plate 2 to be folded in a correct manner. The auxiliary device 3 may be, but is not limited to, a tension spring or an elastic band. In addition, both ends of the elastic member can be connected to the outer side 212 of the first plate 21 and the outer side 222 of the second plate 22 in any suitable manner, such as riveting. In an embodiment, the auxiliary device 3 may be located inside the fabric bag 1 together with the foldable plate 2. In other embodiments, the auxiliary device 3 may be located outside the fabric bag 1.

Referring to FIG. 6, in some embodiments, the foldable plate 2 may be provided with a plurality of through holes 20, which can reduce a weight of the foldable plate 2 and increase an air permeability of the lateral seat cover portion 1A.

Figure 9:
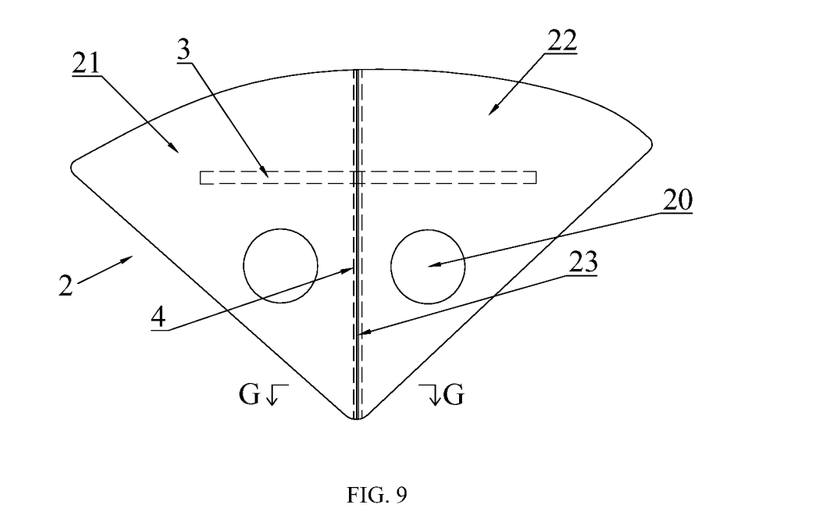
FIG. 9 is a front view of a foldable plate in an unfolded state according to another embodiment of the present disclosure.
Figure 10:
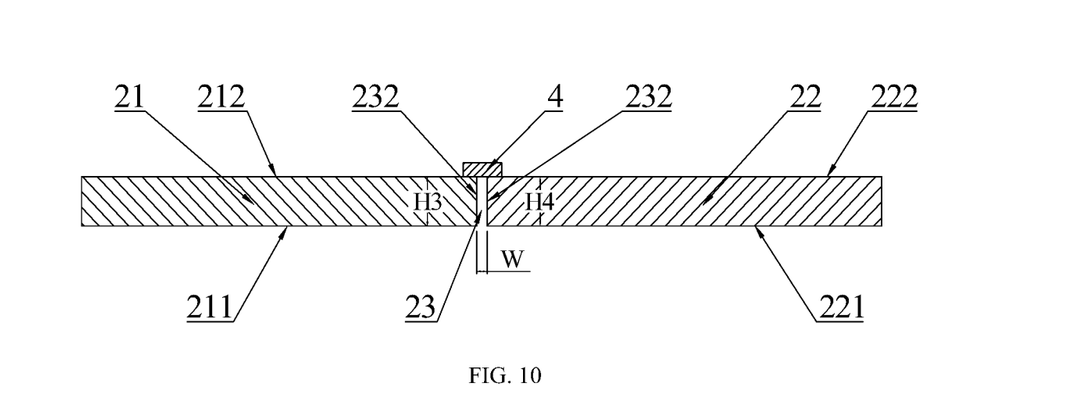
FIG. 10 is a cross-sectional view taken along line G-G of FIG. 9.
Figure 11:
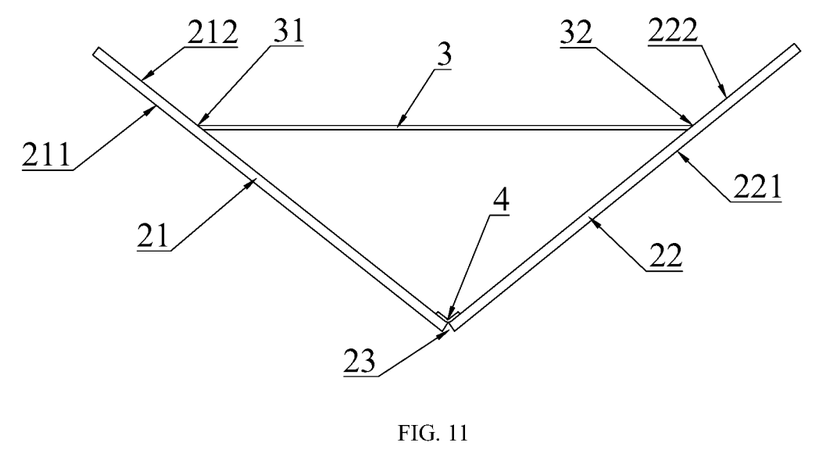
FIG. 11 is a top view of a foldable plate in a folded state according to another embodiment of the present disclosure.

FIG. 9 to FIG. 11 show another embodiment of the foldable plate 2. The first plate 21 and the second plate 22 of the foldable plate 2 are two separate plates. The first plate 21 and the second plate 22 may be plastic plates with a certain hardness, and the plastic plate may be made of a suitable material, such as PE or PP. The first plate 21 and the second plate 22 are connected by at least one pivot member 4, and the pivot member 4 is provided adjacent to an outer side of the foldable plate 2 (that is, the side of the foldable plate 2 facing the outer side fabric 12). In some embodiments, the pivot member 4 may be strip-shaped, which may be made of fabric or aluminum foil. The pivot member 4 can be attached to the outer side 212 of the first plate 21 and the outer side 222 of the second plate 22 by any suitable means such as welding, bonding or riveting.

Referring to FIG. 10, when the foldable plate 2 is in the unfolded state, the slot 23 is formed between the first plate 21 and the second plate 22. As previously described, by reasonably configuring the width W of the slot 23, a thickness H3 of the first plate 21, and a thickness H4 of the second plate 22, the foldable plate 2 can be prevented from being folded in an incorrect manner, so that the foldable plate 2 can be folded in the correct manner. For example, the width W of the slot 23 is less than a sum of the thickness H3 of the first plate 21 and the thickness H4 of the second plate 22. In this way, when the foldable plate 2 is folded, both sidewalls 232 of the slot 23 can abut against each other to prevent the inner side 211 of the first plate 21 and the inner side 221 of the second plate 22 from approaching each other, which will cause the foldable plate 2 to be folded in the correct folding manner with the outer side 212 of the first plate 21 and the outer side 222 of the second plate 22 approaching each other.

It should be understood that there are many other embodiments of the pivot member 4, which are not limited hereto. For example, the pivot member 4 can include a plurality of hinges. Specifically, the plurality of hinges are spaced apart along the slot 23, and both arms of each hinge are connected to the outer side 212 of the first plate 21 and the outer side 222 of the second plate 22, respectively.

In other embodiments not shown, the first plate 21 and the second plate 22 of the foldable plate 2 may be two separate plates connected through a pivot shaft. The auxiliary device 3 includes a torsion spring sleeved on the pivot shaft. Both spring arms of the torsion spring are connected to the first plate 21 and the second plate 22, respectively. In this case, the above-mentioned tension spring or elastic band may be removed. When the foldable plate 2 is in the unfolded state, the torsion spring is tensioned. When the frame 200 is folded, the torsion spring resets and pulls the foldable plate 2 to be folded in a correct folding manner.

In addition, in some embodiments not shown, the first plate 21 and the second plate 22 can be directly or indirectly sewn on the outer side fabric 12 of the fabric bag 1, which can avoid the inconvenience of folding the foldable plate 2 due to any movement of the foldable plate 2 in the fabric bag 1. In this way, a size of the foldable plate 2 can be significantly reduced without having to adapt to the shape of the fabric bag 1, which can reduce a weight of the lateral seat cover portion 1A. In some embodiments, the foldable plate 2 may be provided with a plurality of through holes 20, which can further reduce the weight of the foldable plate 2 and increase the air permeability of the lateral seat cover portion 1A.

Figure 12:
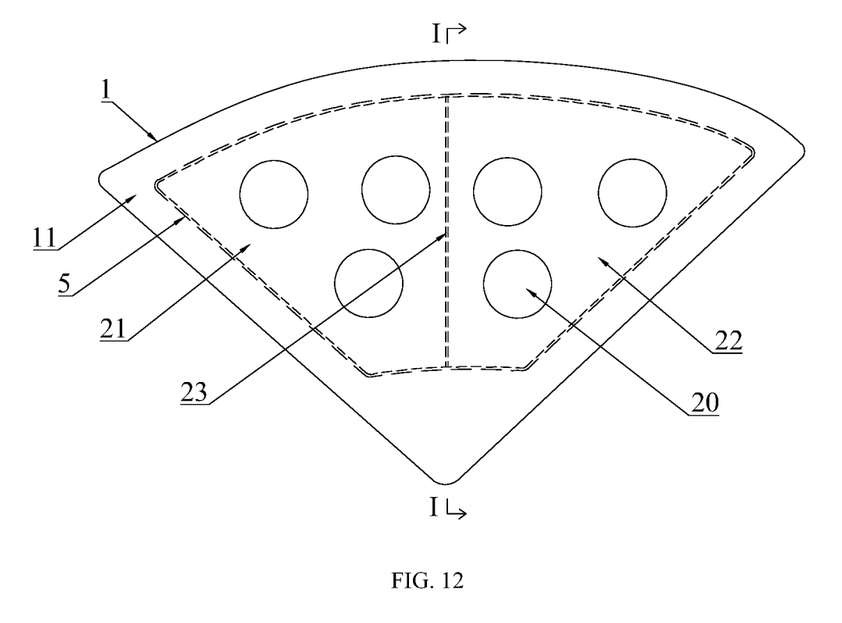
FIG. 12 is a front view of a lateral seat cover portion of a baby stroller according to another embodiment of the present disclosure.
Figure 13:
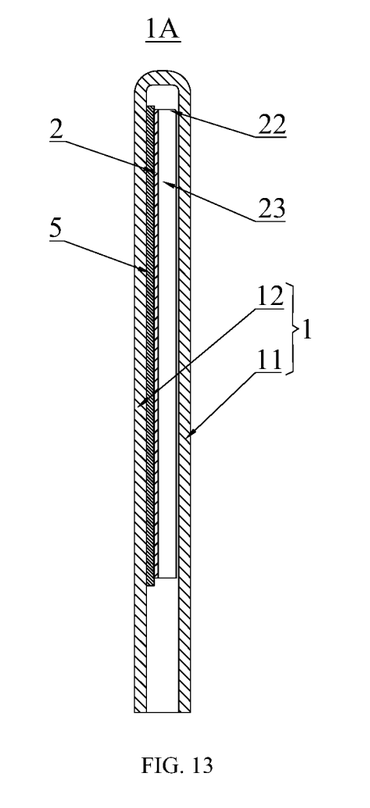
FIG. 13 is a cross-sectional view taken along line I-I of FIG. 12.

In some embodiments not shown, the auxiliary device 3 is the aforementioned tension spring or elastic band, and the first plate 21 and the second plate 22 are sewn on the outer fabric 12 of the fabric bag 1. In this case, the auxiliary device 3 can be located outside the bag 1. Specifically, both ends of the auxiliary device 3 may be connected to the outer side 212 of the first plate 21 and the outer side 222 of the second plate 22 through being connected to the outer side fabric 12 of the fabric bag 1. Alternatively, both ends of the auxiliary device 3 extend through the outer side fabric 12 of the fabric bag 1 to be connected to the outer side 212 of the first plate 21 and the outer side 222 of the second plate 22. In other embodiments not shown, the auxiliary device 3 is the above-mentioned torsion spring sleeved on the pivot shaft. In this case, even if the first plate 21 and the second plate 22 are sewn on the outer side fabric 12 of the fabric bag 1, the auxiliary device 3 can still be located in the fabric bag 1. FIG. 12 and FIG. 13 show another embodiment of the lateral seat cover portion 1A, which is similar to the lateral seat cover portion 1A in FIGS. 5 to 11. The main difference between the lateral seat cover portion 1A in FIG. 12 and FIG. 13 and the lateral seat cover portion 1A in FIGS. 5 to 11 lies in that instead of the elastic member, a liner 5 is provided in the fabric bag 1. The liner 5 serves as the auxiliary device to enable the outer side 212 of the first plate 21 and the outer side 222 of the second plate 22 to approach each other. The foldable plate 2 may have the structure as described in the above embodiments.

Referring to FIG. 13, the liner 5 is connected to the outer side fabric 12, and both the first plate 21 and the second plate 22 are connected to the liner 5, that is, the liner 5 is located between the outer side fabric 12 of the fabric bag 1 and the foldable plate 2. The liner can be made of soft foam or any suitable material. When manufacturing the lateral seat cover portion 1A, the first plate 21 and the second plate 22 is firstly sewn together with the liner 5, respectively, and then the liner 5 is sewn together with the outer side fabric 12. When the frame 200 is folded, the folding line formed by the liner 5 cooperate with the slot 23 of the foldable plate 2 to enable the foldable plate 2 to be folded in a correct folding manner in which the outer side 212 of the first plate 21 and the outer side 222 of the second plate 22 approach to each other. Since the foldable plate 2 is fixed on the outer side fabric 12 of the fabric bag 1 and will not move arbitrarily in the fabric bag 1, the size of the foldable plate 2 can be significantly reduced without having to adapt to the shape of the fabric bag 1, which can reduce the weight of the lateral seat cover portion 1A. In some embodiments, the foldable plate 2 may be provided with a plurality of through holes 20, which can further reduce the weight of the foldable plate 2 and increase the air permeability of the lateral seat cover portion 1A.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A lateral seat cover portion of a baby stroller, comprising:
   a fabric bag comprising an inner side fabric and an outer side fabric opposite to each other;
   a foldable plate wrapped in the fabric bag and located between the inner side fabric and the outer side fabric, wherein the foldable plate comprises a first plate and a second plate pivotally connected to the first plate, and when a frame of the baby stroller in an unfolded state, the foldable plate is in an unfolded state; and
   an auxiliary device, wherein when the frame of the baby stroller is folded, the auxiliary device enables an outer side of the first plate and an outer side of the second plate to approach each other, thereby switching the foldable plate from the unfolded state to a folded state,
   wherein when the foldable plate is in the unfolded state, the foldable plate is provided with a slot between the first plate and the second plate, an inner side of the first plate and an inner side of the second plate are spaced apart by the slot; and
   when the foldable plate is switched from the unfolded state to the folded state, both sidewalls of the slot prevent the inner side of the first plate and the inner side of the second plate from approaching each other.

2. The lateral seat cover portion according to claim 1, wherein the foldable plate is provided with a through hole.

3. The lateral seat cover portion according to claim 1, wherein a width of the slot is less than a sum of a thickness of the first plate and a thickness of the second plate.

4. The lateral seat cover portion according to claim 1, wherein the foldable plate is an integrally-formed element, the slot is located on an inner side of the foldable plate, and a depth of the slot is less than a thickness of the foldable plate, and the first plate and the second plate are pivotally connected via a bottom wall of the slot.

5. The lateral seat cover portion according to claim 1, further comprising:
   at least one pivot member, wherein both the outer side of the first plate and the outer side of the second plate are connected to the at least one pivot member.

6. The lateral seat cover portion according to claim 1, further comprising:
   a liner provided in the fabric bag, the liner being connected to the outer side fabric, wherein the first plate and the second plate are both connected to the liner.

7. A baby stroller, comprising:
   a frame; and
   a seat cover provided on the frame, the seat cover comprising:
   a seat portion;
   a backrest portion connected to the seat portion;
   two side wing portions provided on two sides of the backrest portion; and
   the lateral seat cover portion according to claim 1 connected to the two side wing portions, respectively.

8. A lateral seat cover portion of a baby stroller, comprising:
   a fabric bag comprising an inner side fabric and an outer side fabric opposite to each other;
   a foldable plate wrapped in the fabric bag and located between the inner side fabric and the outer side fabric, wherein the foldable plate comprises a first plate and a second plate pivotally connected to the first plate, and when a frame of the baby stroller in an unfolded state, the foldable plate is in an unfolded state; and
   an auxiliary device, wherein when the frame of the baby stroller is folded, the auxiliary device enables an outer side of the first plate and an outer side of the second plate to approach each other, thereby switching the foldable plate from the unfolded state to a folded state,
   wherein the auxiliary device comprises an elastic member, a first end of the elastic member is connected to the outer side of the first plate, and a second end of the elastic member is connected to the outer side of the second plate.

9. The lateral seat cover portion according to claim 8, wherein the elastic member is a tension spring, a torsion spring or an elastic band.

10. A lateral seat cover portion of a baby stroller, comprising:
   a fabric bag comprising an inner side fabric and an outer side fabric opposite to each other;
   a foldable plate wrapped in the fabric bag and located between the inner side fabric and the outer side fabric, wherein the foldable plate comprises a first plate and a second plate pivotally connected to the first plate, and when a frame of the baby stroller in an unfolded state, the foldable plate is in an unfolded state;
   an auxiliary device, wherein when the frame of the baby stroller is folded, the auxiliary device enables an outer side of the first plate and an outer side of the second plate to approach each other, thereby switching the foldable plate from the unfolded state to a folded state; and a pivot shaft, wherein the first plate and the second plate are connected through the pivot shaft, the auxiliary device comprises a torsion spring sleeved on the pivot shaft, and two spring arms of the torsion spring are connected to the first plate and the second plate, respectively.

* * * * *